Dec. 29, 1931.    J. T. WORTHINGTON ET AL    1,838,980
DEHYDRATOR WITH CENTRIFUGAL DISCHARGE ELECTRODES
Filed April 1, 1929    2 Sheets-Sheet 1
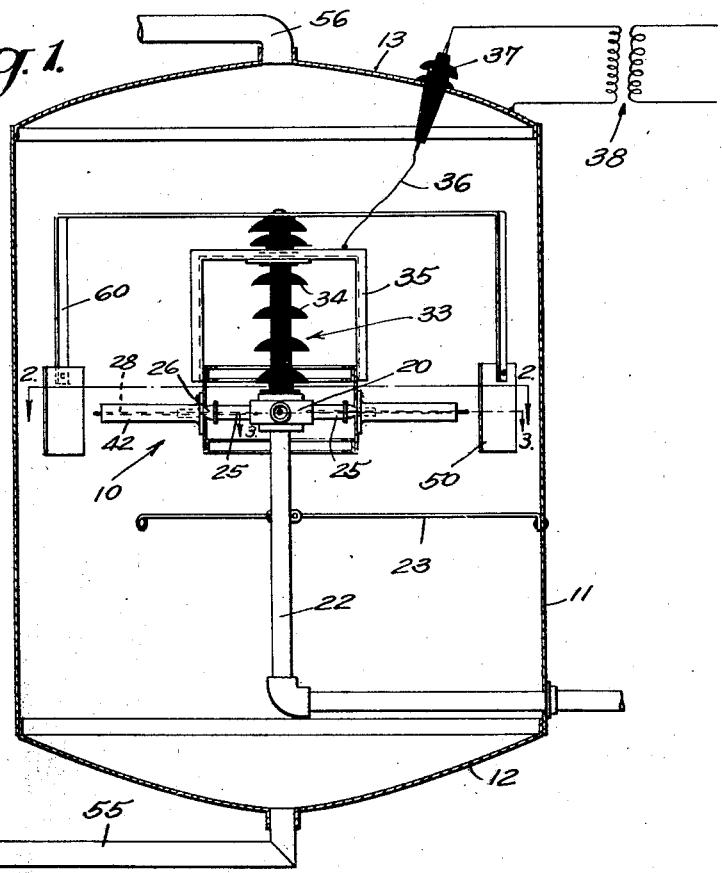
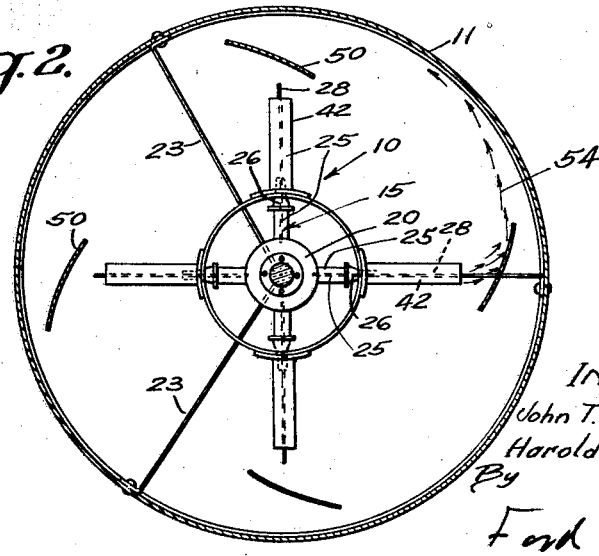
INVENTORS:
John T. Worthington,
Harold C. Eddy,
By
Ford A. Lewis
ATTORNEY.

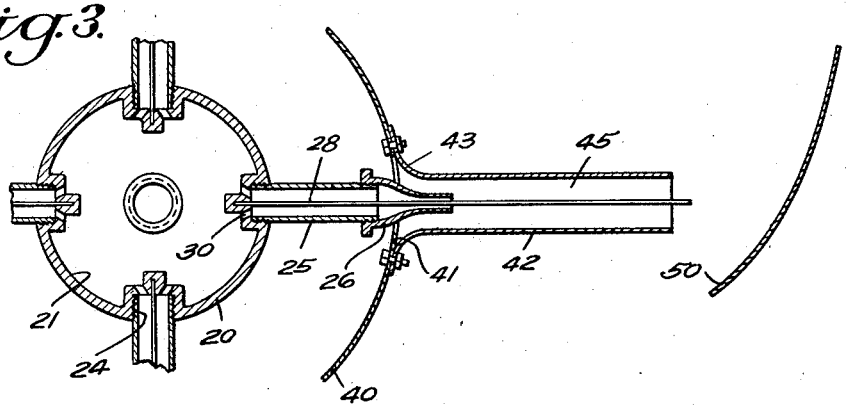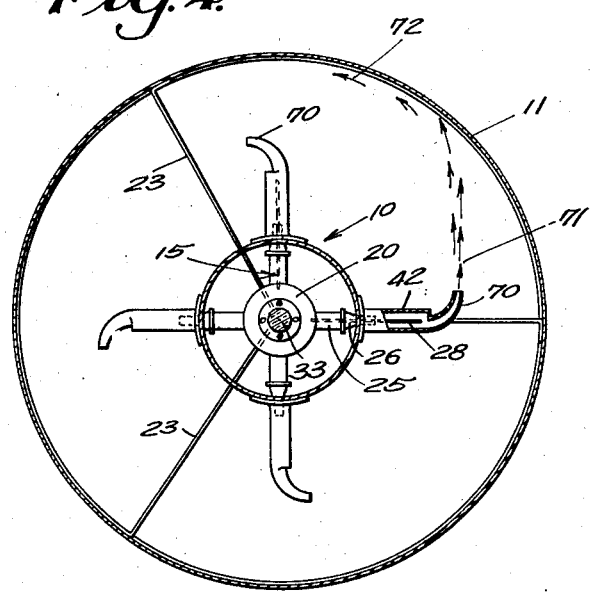

Patented Dec. 29, 1931

1,838,980

UNITED STATES PATENT OFFICE

JOHN T. WORTHINGTON, OF LONG BEACH, AND HAROLD C. EDDY, OF LOS ANGELES, CALIFORNIA, ASSIGNORS TO PETROLEUM RECTIFYING COMPANY OF CALIFORNIA, OF LOS ANGELES, CALIFORNIA, A CORPORATION OF CALIFORNIA

DEHYDRATOR WITH CENTRIFUGAL DISCHARGE ELECTRODES

Application filed April 1, 1929. Serial No. 351,657.

Our invention relates to the art of separating mechanical mixtures of two substances, and finds a particular utility in the art of breaking emulsions, although the apparatus shown and described herein is adapted for use in other arts and in other capacities.

In an application entitled "Dehydrator having radial Venturi-tube type electrodes", filed October 9, 1928, by John T. Worthington, Serial No. 311,389, there is disclosed an electric treater somewhat similar to the one which forms the subject-matter of the present application, this treater having electrodes defining one or more treating spaces which extend radially toward the walls of the tank in which the electrodes are positioned. Fluid is supplied to the treating spaces through a common supply means, and the electrodes are designed to recirculate a stream of dielectric fluid through the treating spaces to prevent any possibility of short-circuiting in the field.

It is an object of this invention to prevent the formation of short-circuiting chains, not only in the treating space, but also in the space into which the treated fluid is discharged.

The action taking place may best be illustrated by a practical example. Oil as it comes from the well is often associated with water in the form of emulsion, the oil being the continuous phase and the water the dispersed phase so that droplets of water are suspended in the otherwise dry oil. These droplets are not of sufficient size to gravitate from the oil, and to agglomerate these particles the emulsion is often passed through an electric field of high stress. Sufficient agglomeration takes place to permit the now larger particles of water to gravitate from the oil if sufficient settling time is allowed.

Where the treated emulsion is forced through the electric field at a relatively high velocity, the water particles have a tendency to form a short-circuit between the live electrode and the tank. Thus, if a pair of electrodes is so positioned that the emulsion passing therebetween will strike the enclosing tank, a needless flow of current flows between the electrodes and the tank, this current sometimes taking on short-circuiting characteristics. It should not be assumed, however, that this current is invariably large enough to decrease the voltage across the electrodes to substantially zero. In a treater as described in the application of John T. Worthington, above referred to, such a complete short-circuiting never takes place, but the tank walls at a point in alignment with the treating space will have a bright spot where the stream of emulsion impinges against the tank. This is true even when the treater is operating at a relatively efficient rate and indicates a current-flow from the live electrode to the tank, which, of course, consumes energy.

We have found it possible to eliminate this wastage of electric energy by placing a barrier in the path of travel of the treated emulsion, and it is an object of this invention to provide a barrier insulated from the electrodes, or from the tank, or from both, and against which the treated emulsion or other fluid impinges after leaving the main treating space.

A further object of the invention is to provide a baffle structure which is set at an angle or is curved so as to impart a rotary motion to the emulsion after this emulsion has been treated by an electric field. Desidable results are obtained by such a construction whether or not the baffle is insulated from the electrode structure, for the rotary motion imparted to the treated emulsion accelerates the separation of the phases due to the difference in density thereof.

A further object of this invention lies in the provision of a novel method of treating an emulsion by passing this emulsion through an electric field and subsequently imparting a rotary motion to the treated emulsion.

Still another object of this invention is to provide a novel method of treating an emulsion wherein the emulsion is passed through an electric field at a relatively high velocity, the stream of treated fluid being deflected after leaving this field in a manner to assist in the separation of the phases thereof.

A further object of the invention is to provide a means of obtaining a dry oil for insulation purposes by imparting a rotary movement to the fluid after electrical treatment.

Still further objects of this invention will be made evident to those skilled in the art from the following description.

Referring to the drawings in which two forms of the invention are illustrated,—

Fig. 1 is a sectional view of the preferred form of our treater.

Fig. 2 is a horizontal sectional view taken on the line 2—2 of Fig. 1.

Fig. 3 is an enlarged sectional view taken on the line 3—3 of Fig. 1.

Fig. 4 is a sectional view similar to Fig. 2 illustrating an alternative form of our invention.

Referring particularly to Fig. 1, we provide an electrode structure 10 positioned in a tank 11 having a base 12 and a cover 13. The electrode structure 10 provides as one of the elements thereof a grounded electrode 15 including a distributor 20 which provides a distributing chamber 21. An intake pipe 22 is threadedly received in the central portion of the distributor 20 and extends downward and through the walls of the tank 11, this pipe being adapted to supply an emulsion to be treated to the distributing chamber 21, and to support the electrode structure in the tank 11, this supporting action being increased by braces 23 extending between the intake pipe 22 and the tank 11.

Sockets 24 are formed around the periphery of the distributor 20, each socket being threaded to receive a tube 25 having a nozzle 26 secured to the end thereof and directed radially outward. A rod 28 is firmly embedded in the inner wall of each socket and extends coaxialy through the tube and through the nozzle 26 so as to provide a relatively small annular space between the periphery of the rod and the walls of the nozzle. The interior of each tube 25 communicates with the distributor 20 through openings 30, so that the emulsion supplied to this distributing chamber under pressure passes outward through each nozzle 26 in a fluid envelope immediately surrounding the rod 28.

Supported on top of the distributor 20 is an insulator structure 33 which may be conveniently formed of a plurality of insulating units 34 secured one to the other. This insulator structure 33 is adapted to support a frame 35 which is suspended from an intermediate section thereof, and which is electrically connected to a conductor 36 extending through an insulator 37 and through one terminal of the secondary of the high voltage transformer 38, the other terminal of this secondary being connected to the tank. A shell 40 is supported by the frame 35 concentric with the axis of the distributor 20, this shell having openings 41 therein into which the nozzle structures 26 extend. Mounted with its axis concentric with the axis of each opening 41 is a live electrode 42 which forms a part of the electrode structure 10, this electrode being in the form of a tube concentric with the rod 28 and having a flared end 43 conforming in shape to the taper of the nozzle structure 26.

The emulsion passing through each nozzle structure is thus confined within the live electrode thereadjacent, and moves in a stream through a treating space 45 formed between the live electrode and the rod 28 of the grounded electrode. The nozzle structure 26 acts as an injector in a manner to draw into the treating space a stream of substantially dry oil which lies inside the shell 40, thus preventing any short-circuiting. The centrifugal motion imparted to the treated fluid classifies the fluids so that a much drier oil is obtained at the openings 41.

The treating action takes place immediately around the rod 28, and is very rapid, thus permitting relatively high velocities to be utilized. This treating action agglomerates the water particles into larger masses, but these larger masses do not settle out due to the fact that the emulsion is moving at a relatively high velocity. As the emulsion passes through the treating space at this high velocity, it is directed radially outward, and would normally contact the inner wall of the tank 11, thus having a tendency to form short-circuiting or current-conducting paths, due to the lining up of the water particles therein. To prevent this action, we position a barrier 50, preferably curved as shown, in the path of travel of the emulsion, this baffle being disposed at an angle relative to this path so as to deflect the stream of treated emulsion. This deflection itself tends to further agglomerate the water particles and has a strong separating tendency inasmuch as the treated emulsion is forced through an arcuate path, thus setting up centrifugal forces which are stronger on the agglomerated particles of water than they are on the oil, due to the difference in density of the water and oil. Furthermore, this baffle sets up a circulatory motion of the liquid in the tank 11, and causes this liquid to move counterclockwise as viewed in Fig. 2 and as indicated by the arrows 54. During this motion, the water particles tend to be thrown outward to the surface of the tank and settle therealong to the lower end of the tank, being removed through a water pipe 55. Similarly, the dry oil rises in the tank 11 and is removed through an outlet pipe 56.

We have found it desirable to mount the barriers 50 in such a manner that they are insulated from the electrode structure 10. This is preferably accomplished by means of a frame 60 having arms to which the baffles are secured, this frame being mounted on the upper end of the insulator structure 33 so that one or more of the insulator units 34 are positioned between the frames 35 and 60.

However, this construction is not absolutely essential to the invention, and other structures may be utilized. So also, we have found that it is not invariably necessary to use an insulated baffle for deflecting the stream of treated emulsion ejected from the treating space. Thus, in Fig. 4 we have illustrated an alternative form of our invention wherein the tubes 42 of the electrode extend beyond the rods 28 of the grounded electrode, and have curved barriers or hoods 70 formed thereon for turning the stream of treated emulsion and discharging this stream as indicated by the arrows 71 of Fig. 4. During this deflection, the separating action is accelerated, as previously described, and after the treated emulsion reaches the walls of the tank 11, this emulsion is circulated as indicated by the arrows 72, thus further accelerating the separating action. The arrows also indicate the elongation of the electric path between the end of the shield and tank.

Thus, we have found that our method of treating emulsion by deflecting a stream of this emulsion which is discharged from a treating space to be a very effective one regardless of the apparatus utilized.

The tank 11 is ordinarily substantially filled with liquid, so that the deflection of the stream of treated emulsion rotates this liquid. The deflection takes place between the live electrode and the tank and very materially increases the length of path taken by a given water particle before reaching the tank. Not only does such a path of increased length tend to eliminate short-circuiting, but also the deflection into a rotating body of liquid further decreases this tendency. Thus, if the electrodes discharged into air, the emulsion would move directly to the tank in a straight path which is tangential to the barrier, while if discharged into a body of rotating liquid, this path is made arcuate and much longer.

While we have shown and described two embodiments wherein this method may be performed, it should be understood that we are not limited to these embodiments, and that our invention comprehends the use of other forms of apparatus falling within the scope of the appended claims.

The present application is an improvement on the apparatus shown in a copending application of Levering Lawrason, Serial No. 216,543, which contains claims directed to certain of the subject-matter herein disclosed.

We claim as our invention:

1. In combination: a tank; a pair of electrodes defining a treating space; means for directing a relatively fast-moving stream of emulsion through said treating space; and baffle means positioned beyond said treating space and spaced from both of said electrodes for deflecting said stream of emulsion after this stream has been treated in said treating space.

2. In combination: a pair of electrodes defining a treating space; means for directing a relatively fast-moving stream of emulsion through said treating space; and means insulated from said electrodes for deflecting said stream of emulsion after this stream has been treated in said treating space.

3. In combination: a live electrode; a grounded electrode extending into said live electrode and defining a treating space therebetween; means for directing an emulsion to be treated longitudinally through said treating space; a baffle positioned in the path of said emulsion after leaving said treating space; and means for insulating said baffle from said live and grounded electrodes.

4. In combination: a grounded electrode; an insulator structure; a live electrode supported by one portion of said insulator structure; and a baffle supported by another portion of said insulator structure.

5. In combination: a tank; a grounded electrode in said tank; an insulator structure; a live electrode supported by one portion of said insulator structure; and a baffle supported by another portion of said insulator structure and positioned in the path of a fluid leaving the space between said electrodes.

6. In combination: a tank containing a liquid; a pair of horizontally disposed electrodes in said tank, said electrodes defining a treating space; means for introducing emulsion into said treating space, said emulsion leaving said space in the form of a stream moving toward a side wall of said tank; and a baffle insulated from at least one of said electrodes and positioned in the path of travel of the treated emulsion leaving said treating space to introduce the treated emulsion non-radially into said liquid in said tank to set said liquid into rotation.

7. In combination: a tank; a pair of electrodes in said tank, said electrodes defining a treating space; means for introducing emulsion into said treating space, said emulsion leaving said space in the form of a stream moving toward said tank; and a baffle in the path of travel of the treated emulsion and angularly positioned with respect to said stream to deflect said treated emulsion to move centrifugally in said tank.

8. A combination as defined in claim 7 in which said baffle is insulated from both of said electrodes.

9. In combination: a tank; electrodes defining a plurality of radially extending treating spaces in said tank; means for simultaneously introducing emulsion and dry oil into the inner end of each treating space, said dry oil being withdrawn from the central portion of said tank; and means for centrifugally circulating the treated emulsion in said tank to effect an outward movement of the water particles and an inward movement of the dry oil particles with respect to said tank, whereby at least a portion of said dry oil particles are recirculated through said treating spaces by said first-named means.

10. In combination: a tank containing a body of liquid; primary and secondary electrodes insulated from each other in said tank and surrounded by said liquid, said electrodes providing a treating space directed toward one of the walls of said tank; means for forcing the fluid to be treated through said treating space, said fluid moving toward said wall of said tank; and a stationary baffle means positioned in the path of travel of said fluid issuing from said treating space whereby said fluid is deflected and injected non-radially into said body of liquid to set said body of liquid in said tank into rotation.

11. In combination: a tank containing a body of liquid; an electrode of tubular shape, one end of said electrode being positioned near the central axis of said tank, the ends of said tubular electrode being of unequal distance from said axis of said tank; means for moving a stream of emulsion through said tubular electrode whereby a portion of said liquid is withdrawn from the central portion of said tank and circulated through said tubular electrode; and means for deflecting the emulsion leaving said tubular electrode in a manner to rotate said liquid in said tank about the vertical axis of said tank.

12. In an electric treater, the combination of: a tank containing a liquid; a tubular electrode in said tank; means for introducing emulsion to be treated into said tubular electrode; means for electrically treating said emulsion in said tubular electrode; and a curved hood on said tubular electrode and receiving the treated emulsion, said hood providing an outlet passage which is non-radially disposed with respect to said tank and angled with respect to the axis of said tubular electrode whereby said treated emulsion is discharged in a direction to rotate said liquid in said tank.

13. In an electric dehydrator, the combination of: a tubular electrode; an inner electrode extending into one end of said tubular electrode but not completely therethrough; means for introducing the emulsion to be treated into said end of said tubular electrode, said emulsion being treated in the electric field set up between said electrodes; and a hood connected to and extending across the other end of said tubular electrode and providing an outlet passage discharging the treated emulsion in a direction angularly disposed with respect to the axis of said tubular electrode, said inner electrode terminating short of said hood whereby the direction of flow of the treated emulsion is changed after it passes beyond said inner electrode.

In testimony whereof, we have hereunto set our hands at Los Angeles, California, this 23d day of March, 1929.

JOHN T. WORTHINGTON.
HAROLD C. EDDY.